(12) United States Patent
Nicholas

(10) Patent No.: US 6,558,462 B1
(45) Date of Patent: May 6, 2003

(54) METHOD OF MAKING A POWDERED PRODUCT FROM TRINIDAD LAKE ASPHALT FOR USE IN A ROAD BUILDING MIX

(76) Inventor: Dolly Nicholas, 15 Hillcrest Drive, Battoo Lands, Marabella (TT)

(*) Notice: Subject to any disclaimer, the term of this patent is extended or adjusted under 35 U.S.C. 154(b) by 0 days.

(21) Appl. No.: 09/529,629
(22) PCT Filed: Oct. 7, 1998
(86) PCT No.: PCT/IB98/01560
§ 371 (c)(1), (2), (4) Date: Sep. 12, 2000
(87) PCT Pub. No.: WO99/19423
PCT Pub. Date: Apr. 22, 1999

Related U.S. Application Data

(60) Provisional application No. 60/075,876, filed on Feb. 25, 1998, provisional application No. 60/064,124, filed on Nov. 3, 1997, provisional application No. 60/064,101, filed on Nov. 3, 1997, provisional application No. 06/061,496, filed on Oct. 9, 1997, and provisional application No. 60/061,461, filed on Oct. 9, 1997.

(51) Int. Cl.⁷ ............................................. C09D 195/00
(52) U.S. Cl. ......................... 106/281.1; 106/289.02; 106/289.05; 524/59
(58) Field of Search ..................... 106/281.1, 284.02, 106/284.05; 524/59

(56) References Cited

U.S. PATENT DOCUMENTS

| | | |
|---|---|---|
| 4,560,414 A | 12/1985 | Kikegawa |
| 4,835,199 A * | 5/1989 | Futamura et al. ............. 524/66 |
| 5,328,943 A | 7/1994 | Isobe |
| 5,728,202 A * | 3/1998 | Nelson et al. ........... 106/281.1 |

FOREIGN PATENT DOCUMENTS

| | | |
|---|---|---|
| DE | 24 38 330 A | 2/1976 |
| FR | 1 519 436 | 7/1968 |
| GB | 447 416 A | 5/1936 |
| GB | 987260 A | 3/1965 |

OTHER PUBLICATIONS

No. 61 of 1993, Jul. 1993, Trinidad and Tobago.
Database WPI, Section Ch, Week 8034, Derwent Publications Ltd., London, GB & JP 55 089353, (Jul. 1980).

* cited by examiner

Primary Examiner—David Brunsman
(74) Attorney, Agent, or Firm—Nixon & Vanderhye P.C.

(57) ABSTRACT

Method of processing Trinidad Lake Asphalt (TLA), including the steps of removing Trinidad Lake Asphalt from the earth and adding thereto at least one stabilizing material of a type which increases the melting point of the TLA to produce a stabilized product. The stabilizing material is preferably clay, carbonaceous material, silica and/or polymer. The stabilized product is then pulverized or otherwise broken down into discrete elements, such as pellets or powder. The discrete elements are then packaged into, for example, polyethylene bags and stored or transported for later use. The stabilizer prevents the discrete elements from coalescing during storage or transport. The bags of discrete TLA elements may be used to improve road building mixes by throwing the entire bag, including the bag itself, if desired, into a mixer with the other road building materials. A method is also disclosed for increasing the surface tension of the TLA in order to make the TLA more user friendly.

1 Claim, 2 Drawing Sheets

METHOD OF MAKING A POWDERED PRODUCT FROM TRINIDAD LAKE ASPHALT FOR USE IN A ROAD BUILDING MIX

RELATED APPLICATIONS

The instant application hereby claims the benefit of the filing date of the following U.S. provisional patent applications: Ser. No. 60/061,461 filed Oct. 9, 1997; Ser. No. 60/061,496 filed Oct. 9, 1997; Ser. No. 60/064,101 filed Nov. 3, 1997; Ser. No. 60/064,124 filed Nov. 3, 1997; and Ser. No. 60/075,876 filed Feb. 25, 1998.

BACKGROUND OF THE INVENTION

The present invention relates generally to the field of processing Trinidad Lake Asphalt, and, more particularly, to improved methods for processing Trinidad Lake Asphalt which make it more user friendly and which enhance the characteristics thereof when used in road building and other applications.

Trinidad Lake Asphalt (hereafter "TLA"), also known as Trinidad Natural Asphalt or Epure, is a naturally occurring Lake Asphalt which is found in the island of Trinidad in the West Indies. This natural phenomenon, TLA, is different from and is not to be confused with tar sands, or tar pits or even asphalt which is a natural or mechanical mixture in which bitumen is associated with mineral matter. An accepted definition which has been given to TLA is: an asphalt which, as found in nature, is in a condition of flow or fluidity. As dug from the earth, TLA contains thirty percent (30%) water which is normally removed through refining under conditions of temperature. The molten material is then filtered and typically packed into silicone treated hardboard drums. The drums are typically silicone treated as the temperature at which the molten TLA is filled into the drum is generally around 163° C.

The known processing methods for TLA have several disadvantages. More particularly, TLA is generally dug from the earth and packaged in silicone coated drums. This bulk form of TLA cannot be conveniently used or shipped. Moreover, since the TLA is refined at approximately 163° C., the drums must be coated with a releasing agent, such as silicone, that is able to withstand such high temperatures. After the TLA is packed into the hardboard drums, the material contracts or shrinks upon cooling. Thus, the cooled drums generally have to be brought back to the stills to be "topped up" after cooling in order to provide a full drum. The typical drums weigh about 230 kg. The disposal of these drums after use is now an environmental problem.

The drums are generally required for local and export sales of TLA because the TLA has a melting point of approximately 85° C. and, as a result, the TLA suffers from the Sol Effect, in that at room temperature TLA behaves like a liquid material even though it is considered a solid material at that temperature. Thus, with known techniques for processing TLA, the TLA must be placed in containers like hardboard drums in order to properly contain the material during shipment and/or storage. Flexible containers, such as plastic bags, cannot be used because of the Sol Effect and resulting deformity of the material when placed in such containers during storage or shipment. Moreover, if the TLA is formed into discrete elements, such as pellets, within a container, the pellets will coalesce during storage or shipment, thereby preventing the TLA from being used or maintained in a pelletized form.

Rubberized bitumens (ex refinery) which are presently being used as road building materials suffer from the fact that they phase separate, and also cannot be used in extreme conditions of high and low temperatures. TLA is known the world over as being capable of enhancing the properties of road mixes. In fact, TLA has been used as a "modifier" in road building and rubber has been added to road mixes to improve the ductility of the binder. This feature (ductility) of the binder has been found to be useful for low temperate regions to avoid cracking of the pavement. Examples of such use are found on George Washington Bridge, New York and JFK Airport. However, in extremely cold conditions even the road mixes which contain TLA as a modifier contract, causing fissures or small cracks. The polymer modified bitumens, which are supposed to alleviate this problem have failed miserably due to phase separation.

In road building, the SHRP specifications specifically outline what performance standard a finished road mix must have in certain places, such as in the United States. TLA has never enjoyed major success in the marketplace, because of the handling problems which are associated with the material, as described in detail above, notwithstanding the fact that TLA has the advantage of being non-carcinogenic and an entirely natural material. TLA has not heretofore been provided in a user friendly state which enables it to be commonly used in applications such as road building, where, for example, adherence to the SHRP specifications is required. Moreover, the used drums which contained the TLA present serious disposal problems for the end user and serious environmental concern in places such as the United States.

Thus, a need exists for an improved method for processing TLA which overcomes the disadvantages of the prior art processing methods.

SUMMARY OF THE INVENTION

It is therefore a primary object of the present invention to provide an improved method for processing TLA which results in a more user friendly TLA product.

A further object of the present invention is to provide an improved method of processing TLA which enables the TLA product to be more easily and cost effectively used in applications such as road building.

Another object of the instant invention is to provide an improved method of producing a TLA product which enables said product to be more easily handled, stored and transported.

Yet another object of the instant invention is to provide an improved method of producing a TLA product which enables said product to more easily be used in road building applications requiring adherence to the SHRP specifications and/or other specifications.

A further object of the invention is to provide an improved method of processing TLA which enables said TLA to be stored and transported in a more environmentally friendly manner.

A further object of the instant invention is to provide an improved method of processing TLA which enables said TLA to be cost effectively used, stored and transported in a crushed, pelletized or powdered form without coalescing.

Yet another object of the instant invention is to provide an improved method of processing TLA which prevents the TLA product from suffering from the Sol Effect.

Yet another object of the instant invention is to provide an improved method for processing TLA which uses non-molten mixers (e.g. Banbury, high shear internal mixers, etc.) instead of molten mixers (heaters, etc.) for the purpose of mixing the Trinidad Lake Asphalt and at least one other raw material.

These and other objects and advantages are achieved by the present invention, which provides an improved method of processing Trinidad Lake Asphalt, including the steps of removing Trinidad Lake Asphalt from the earth and adding thereto at least one stabilizing material of a type which increases the melting point of said Trinidad Lake Asphalt to produce a stabilized product. The stabilizing material is preferably clay, carbonaceous material, silica and/or polymer. Molten or non-molten mixers may be used to combine the TLA and stabilizer to produce a stabilized product. The stabilized product is then pulverized or otherwise broken down into discrete elements, such as pellets, powder, crushed or cut elements. The discrete elements may then be packaged into, for example, polyethylene bags and stored or transported for later use. The stabilizer prevents the discrete elements from coalescing during storage or transport. The bags of discrete TLA elements may be used in road building mixes simply by throwing the entire bag, including the bag itself, if desired, into a mixer with the other road building materials.

In accordance with a more particular object of the instant invention, a polymer, such as rubber, may be used as the stabilizer, thereby resulting in a rubberized and optionally pelletized TLA product. If stabilizers other than polymers are used, a non-rubberized and optionally pelletized TLA product can be produced.

In accordance with another aspect of the instant invention, an improved method of processing Trinidad Lake Asphalt is provided which includes the steps of removing TLA from the earth, breaking the TLA down into a plurality of discrete elements, and adding a surface tension modifier to the plurality of discrete elements to make a stabilized TLA product. The surface tension modifier may simply be a coating on the discrete elements which increases the surface tension thereof or it may be such that it reacts with the TLA to increase the surface tension thereof.

BRIEF DESCRIPTION OF THE DRAWINGS

Other features, objects and advantages of the subject invention will become apparent from a study of the following specification, when viewed in light of the accompanying drawings, which describe preferred applications and embodiments of the instant invention and is not to be interpreted as limiting the scope of the invention beyond the true scope of the appended claims herein, and in which:

DETAILED DESCRIPTION OF THE PREFERRED EMBODIMENTS

The instant invention is directed to an improved method of processing Trinidad Lake Asphalt (TLA) which produces a stabilized TLA product, such as a rubberized or non-rubberized pelletized or powdered TLA product, which has improved characteristics over TLA products produced using known techniques. More particularly, the invention involves combining TLA and at least one other known type of stabilizing material, such as a solid material (e.g., carbon fibers, etc.), and/or liquid material (e.g. water, alcohol, etc.) and/or gaseous material (polar gases, non-polar gases, etc.), and/or any other material which increases the melting point of TLA, increases the surface tension of the TLA, and/or increases the softening point of the TLA.

In accordance with one embodiment of the instant invention, TLA is modified and/or processed to enable its melting point to be raised so that it is within a range of above 85° C. to 1000° C. (inclusive), thereby enabling the TLA to have many useful advantages including, for example, being more user friendly. The processed and/or modified material may be produced in any suitable form, for example, as pellets and/or as a powder and/or as crushed TLA.

The stabilizing material or stabilizer may be any solid and/or liquid and/or gas and/or any combination thereof which enable TLA to have a melting point within a range of above 85° C. to 1000° C. (inclusive). More particularly, the stabilizer can be anything that can react with, be wetted by, or be made wet by TLA. In accordance with the preferred embodiment, the stabilizer is a clay, a carbonaceous material, a silica and/or a polymer. The carbonaceous material may be, for example, fibre (natural or synthetic), carbon black (both for reinforcing and colorant) or charcoal (activated or non-activated). The clay may be, for example, a material known as Claytone 40 and/or silica. The polymer may be, for example, rubber (synthetic or natural), such as from used tires. As will be explained in more detail below, the polymer is used if a rubberized TLA product is desired. In other words, the instant invention is equally applicable to rubberized or non-rubberized TLA products.

Figure 1:
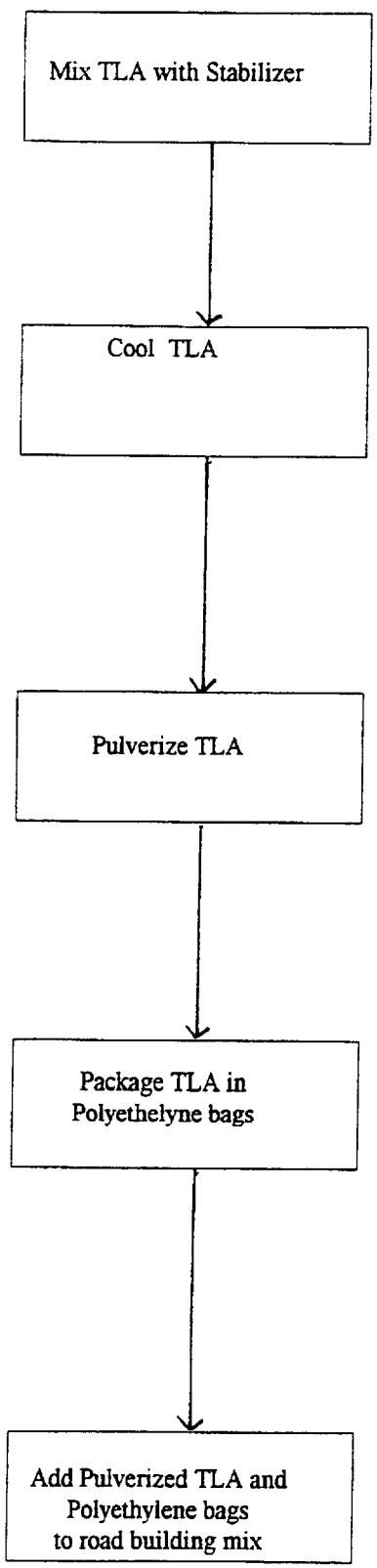
FIG. 1 shows, in flow chart form, the steps used to provide an improved method of processing TLA, in accordance with a preferred embodiment of the instant invention.

Referring now to FIG. 1, wherein an exemplary flow chart of the steps used to implement a preferred embodiment of the invention is shown, the first step is to obtain TLA by removing it from the earth or otherwise obtaining it and mixing or combining the TLA with at least one stabilizer. The stabilizer can be mixed with the TLA by using a non-molten mixer (e.g. Banbury, high shear internal mixers, etc.) or molten mixers (heaters, etc.). If a rubberized TLA product is desired, the stabilizer includes a polymer, such as rubber. The rubber can be a natural rubber, such as Polyisoprene or a synthetic rubber, such as Styrene Butadiene Rubber (SBR) or LATEX. In accordance with the instant invention, any suitable rubber can be used. It is important if a molten mixer is used to prepare the rubber by first solubilizing it with, for example, any petroleum distillate. The rubber can be virgin or used, such as from used tires. One advantage of using the non-molten mixer, such as a Banbury mixer, is that solubilizing the rubber prior to mixing is not necessary with the banbury mixing between 160° C. and 200° C. If the molten mixer is used, the rubber is first solubilized and then made to react with the molten TLA at a temperature of preferably between 160° C. and 200° C. The mixture is then completely mixed (dispersed) to ensure homogeneity. A number of chemical reactions occur, the net result being that very strong chemical bonds are formed, not only between the bitumen portion of the TLA and the rubber but also between the mineral matter portion and the rubber. It is noted that emulsifiers are not used to hold the mixture together. The reason emulsifiers are not needed to hold the mixture together is based on the fact that TLA contains Sulphur, and for vulcanization to occur, Sulphur must be present. Thus, the Sulphur, already present in the TLA, vulcanizes with the respective polymers, thus causing reactions, i.e., bond formation to occur. Therefore, emulsifiers need not be added and this is advantageous because if the TLA did not naturally enable the above stated reactions, emulsifiers would have to be added to facilitate the reactions. Another advantage of the instant invention is that a rubberized TLA product is produced in which no phase separation occurs. This improved TLA product can be used as a modifier to improve road building, particularly for roads subject to extreme temperature variations.

If a rubberized material is not desired, then the stabilizer(s) are selected to be a non-rubber material. As explained above, the stabilizer can be any material which can react with, be wetted by, or be made wet by TLA. The main purpose of the stabilizer (whether rubber or non-rubber) is to increase the melting point of the TLA, thereby preventing discrete elements of the TLA product from coalescing during storage and/or transport. The stabilizer is preferably a clay, a carbonaceous material, a silica (which may be considered a clay) and/or a polymer, but any other suitable stabilizing material may be used. The carbonaceous material may be, for example, fibre (natural or synthetic), carbon black or charcoal (activated or non-activated). The clay may be, for example, a material known as Claytone 40 and/or silica.

The stabilizer enables the TLA product to be broken down from its bulk form into discrete elements, such as powder, pellets or any other desired discrete condition, without having the discrete elements coalesce during storage or shipment, thereby resulting in a much more user friendly product than has heretofore been available. This can be achieved by pulverizing the stabilized TLA. If a molten or non-molten mixer is used, the stabilized TLA is first cooled by, for example, sprinkling the TLA with water while it travels on a conveyor belt, but any other suitable cooling operation can be used.

Once the stabilized TLA is pulverized to, for example, pellets, the pellets or other discrete elements can be packaged into bags, such polyethylene bags or any other suitable container, for storage or shipment to a location wherein to it is to be used. A major advantage of the instant invention is that the discrete elements do not coalesce after being packaged as a result of the stabilizer. Thus, the resulting product is much more user friendly and can be more cost effectively used in a variety of applications.

In accordance with an important feature of the instant invention, the pelletized or other discrete form of the product can be used in road building applications by putting entire packages of TLA into the road mix including the polyethylene bag itself, if desired. As a result, the TLA can be used to improve road building without generating any trash or used containers which have to be discarded. It is noted that the rubberization and/or pelletization of the TLA in accordance with the methods described above does not degrade its performance characteristics and in fact improves its performance in many applications. It is further noted that the invention can be used to produce rubberized TLA, rubberized and pelletized TLA, pelletized TLA, rubberized and powderized TLA, powderized TLA, rubberized and crushed TLA, crushed TLA, or any other rubberized or non-rubberized discrete elements of TLA.

Figure 2:
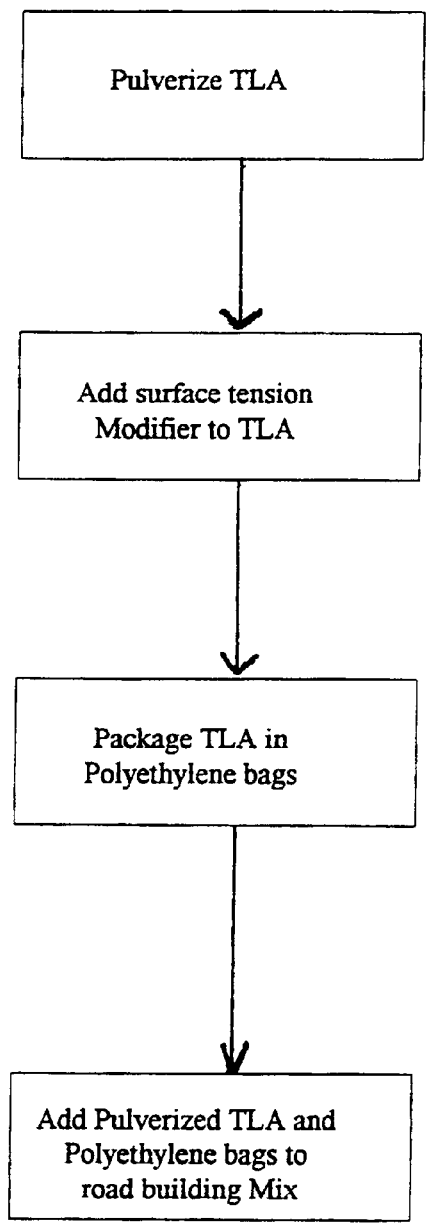
FIG. 2 shows, in flow chart form, the steps used in an alternative embodiment of the instant invention.

In accordance with another embodiment of the invention, as shown in flow chart form in FIG. 2, an improved method of processing Trinidad Lake Asphalt is provided which includes the steps of removing TLA from the earth, breaking the TLA down into a plurality of discrete elements, and adding a surface tension modifier to the plurality of discrete elements to make a stabilized TLA product. The surface tension modifier may simply be a coating on the discrete elements which increases the surface tension thereof or it may be such that it reacts with the TLA to increase the surface tension thereof. For example, once the discrete elements of TLA, such as pelletized TLA, are formed in the manner explained above, the pellets can be coated with or reacted with a natural or synthetic rubber or any other suitable material which increases the surface tension thereof. As with the stabilizing materials discussed above, the surface tension modifiers make the TLA product more user friendly by also preventing the discrete elements from coalescing. In other words, the surface tension modifier is used to increase the softening point, i.e. the transition period between a solid and liquid, in order to make the material more user friendly. The surface tension modifier may be any solid and/or liquid and/or gas and/or any combination thereof which increase the surface tension or softening point of the TLA. The surface tension modifier may be added to the TLA before, after or during the step of breaking the TLA down into discrete elements.

While the preferred forms and embodiments of the invention have been illustrated and described, it will be apparent to those of ordinary skill in the art that various changes and modifications may be made without deviating from the inventive concepts and true spirit of the invention as set forth above, and it is intended by the appended claims to cover all such changes and modification which come within the full scope and true spirit of the invention.

What is claimed is:

1. A method of making a powdered product using Trinidad Lake Asphalt for use in building roads, consisting of:

removing raw Trinidad Lake Asphalt from the ground, wherein the Trinidad Lake Asphalt has a softening point of about 85 degrees C.;

placing the raw Trinidad Lake Asphalt in a high shear mixer that does not apply heat to the raw Trinidad Lake Asphalt other than by a mixing operation itself;

adding alcohol, a non-polar gaseous material, charcoal, clay, silica and a synthetic rubber obtained from used tires to the high shear mixer containing the raw Trinidad Lake Asphalt to define a mixing composition;

mixing the mixing composition in the high shear mixer without applying heat to the mixing composition other than by the mixing operation itself, thereby defining a mixed composition, wherein tie mixing operation itself heats the mixing composition to between 160 to 200 degrees C.;

wherein the mixed composition has an increased softening point as a result of the addition of the alcohol, non-polar gaseous material, charcoal, clay, silica and the synthetic rubber to the Trinidad Lake Asphalt;

cooling the mixed composition by transporting the mixed composition on a conveyor belt while sprinkling the mixed composition with water;

pulverizing the mixed composition beyond pellet size and into a powder;

packaging the powder into polyethylene bags; and adding the polyethylene bags filled with the powder into a road building mix without removing the powder from the bags.

* * * * *